(12) United States Patent
Herz et al.

(10) Patent No.: US 7,593,543 B1
(45) Date of Patent: Sep. 22, 2009

(54) APPARATUS, SYSTEM, AND METHOD FOR TRACING DISTRIBUTION OF VIDEO CONTENT WITH VIDEO WATERMARKS

(75) Inventors: William S. Herz, Hayward, CA (US); Andrew C. Fear, Campbell, CA (US)

(73) Assignee: Nvidia Corporation, Santa Clara, CA (US)

( * ) Notice: Subject to any disclaimer, the term of this patent is extended or adjusted under 35 U.S.C. 154(b) by 651 days.

(21) Appl. No.: 11/305,409

(22) Filed: Dec. 15, 2005

(51) Int. Cl.
*G06K 9/00* (2006.01)
*H04B 1/00* (2006.01)

(52) U.S. Cl. .................. 382/100; 382/240; 375/134

(58) Field of Classification Search ........... 382/100, 382/103, 140, 155, 168, 181, 232–236, 243, 382/274, 276, 284, 287, 292–295, 305, 240; 352/6; 709/217; 463/42; 713/164; 375/134
See application file for complete search history.

(56) References Cited

U.S. PATENT DOCUMENTS

| 6,269,394 | B1 * | 7/2001 | Kenner et al. ............... 709/217 |
| 6,285,774 | B1 * | 9/2001 | Schumann et al. .......... 382/100 |
| 6,661,496 | B2 * | 12/2003 | Sherman et al. ................ 352/6 |
| 7,114,071 | B1 * | 9/2006 | Chmounk et al. ........... 713/164 |
| 7,171,016 | B1 * | 1/2007 | Rhoads ........................ 382/100 |
| 7,248,717 | B2 * | 7/2007 | Rhoads ....................... 382/100 |
| 7,285,048 | B2 * | 10/2007 | Karmarkar ................... 463/42 |

* cited by examiner

*Primary Examiner*—Seyed Azarian
(74) *Attorney, Agent, or Firm*—Cooley Godward Kronish LLP (57) ABSTRACT

Video watermarks are added to video content to trace distribution. The video watermarks are in the form of watermarking pixels. Watermarking modules in individual computers add additional sets of watermarks to whatever initial set of watermarks are present in video content. As a result, the accumulated watermarks in distributed video content provide information on the distribution of video content.

21 Claims, 5 Drawing Sheets

APPARATUS, SYSTEM, AND METHOD FOR TRACING DISTRIBUTION OF VIDEO CONTENT WITH VIDEO WATERMARKS

FIELD OF THE INVENTION

The present invention is generally related to video content protection techniques. More particularly, the present invention is directed to tracing the distribution of video content.

BACKGROUND OF THE INVENTION

A problem for owners of digital video content is that digital video content is susceptible to unauthorized copying and distribution. Once digital video content is distributed it is difficult to maintain control over the video content. Similar problems occur for digital audio content.

Conventional digital rights management techniques typically rely upon techniques to prevent copying. For example, a content provider may use encryption techniques to attempt to prevent illicit copying from a source server. Additionally, content may be provided in a manner intended to limit its distribution, such as in the form of password-protected digital content. These anti-copying measures provide a certain degree of protection against incidental copying.

However, one drawback of conventional digital rights management techniques is that encryption and anti-copying measures can be broken. A further factor is that it is difficult to detect when the encryption and anti-copying measures have been broken. For example, a company distributing digital video files over the Internet using convention digital rights management techniques cannot be confident that its security measures are perfect. Moreover, if there are breaches leading to unauthorized copying and distribution through the Internet it is difficult to assess the amount of unauthorized copying that occurs and its effect on revenues. Additionally, it is difficult with conventional digital rights management techniques to trace unauthorized copying and distribution.

In light of the aforementioned problems, an apparatus, system, and method of the present invention was developed.

SUMMARY OF THE INVENTION

Video watermarks are added to video content to trace content distribution. The video watermarks are in the form of watermarking pixels. Watermarking modules in individual computers add additional sets of watermarks to whatever initial set of watermarks may be present in the video content. As a result, the accumulated watermarks provide information on the distribution of video content.

One embodiment of an apparatus for tracing distribution of video content comprises a watermarking module. The watermarking module is operative to insert watermarking pixels into video frames generated from video content received by a computing system. The watermarking pixels encode tracing information that is imperceptible to an end-user viewing displayed video frames and which is included in copies of the video content distributed from the computing system. The watermarking pixels are embedded into video files such that in one embodiment watermarking pixels eliminate the requirement for conventional separate digital rights management files.

One embodiment of a system for tracing the distribution of video content includes a content server for distributing video content to subscriber computing systems. The video content may include an initial set of watermarking information embedded as watermarking pixels. The system further includes a digital rights manager. The digital rights manager detects watermarking information in scanned video files corresponding to the initial set of watermarking information and any additional sets of watermarking information inserted by individual computers having watermarking modules.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The present invention generally relates to techniques to embed tracing information into digital content. A specific example is digital video content, although it will be understood throughout the following discussion that similar techniques may be applied for digital audio content.

Figure 1:
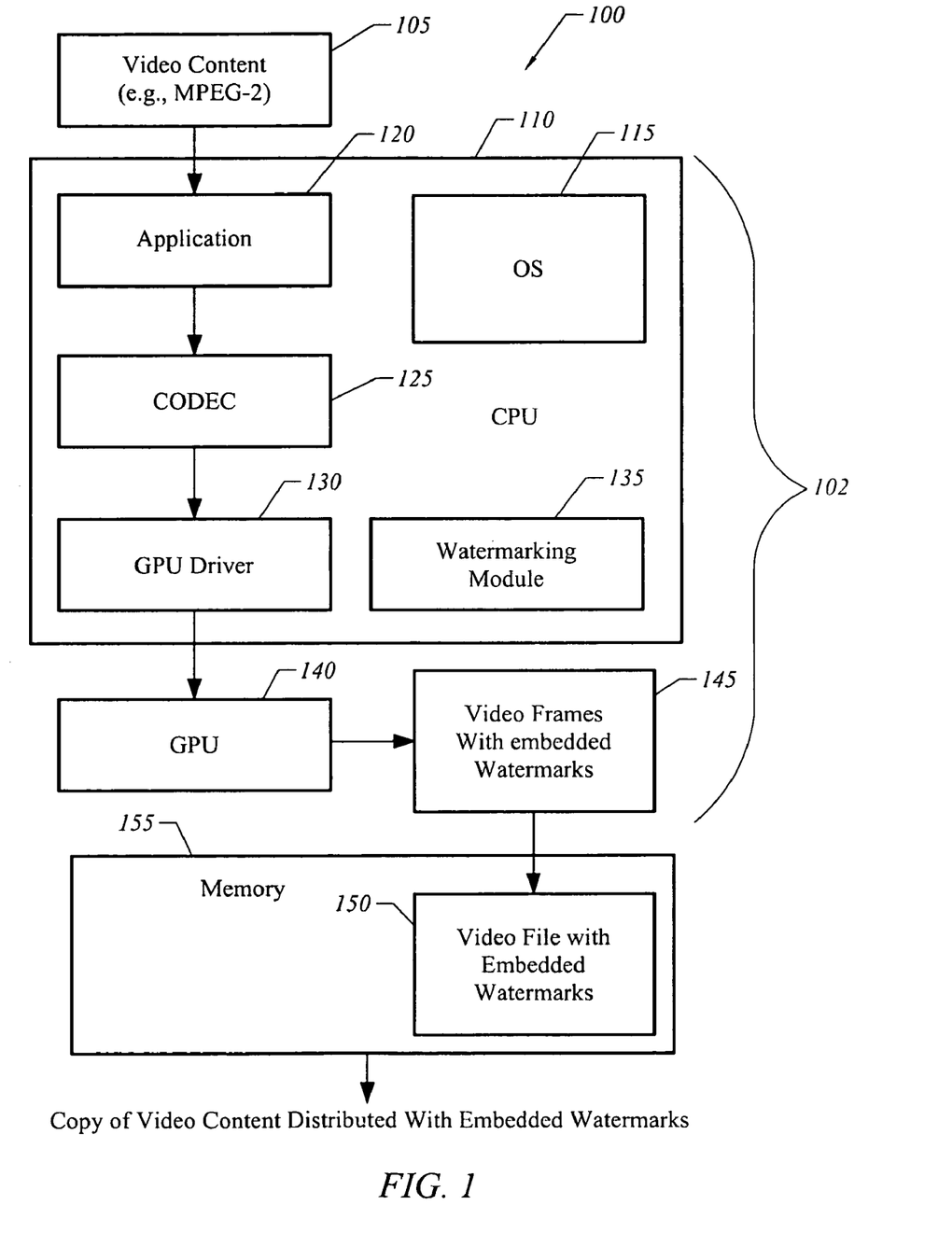
FIG. 1 is a block diagram illustrating a computing system with a watermarking module in accordance with one embodiment of the present invention.

FIG. 1 illustrates a computing system 100 for embedding watermarks into digital content, such as digital video content 105, in accordance with one embodiment of the present invention. Computing System 100 includes a computer 102 with software modules 120, 125, 130, and 135 stored on a computer memory (not shown) which execute on a central processing unit (CPU) 110 having an operating system 115. System 100 receives video content 105. Video content 105 may, for example, be in the form of compressed video content encoded in a video format such as a Moving Picture Experts Group (MPEG) format, such as MPEG-2. Video content 105 may, for example, be received in the form of a transport stream of packets received from a network, such as the Internet. The video content 105 must be decoded to display the video content. Additionally, video processing may be performed to improve video quality.

In one embodiment, a graphics processing unit (GPU) 140 is used to generate video frames 145 which may be displayed. One aspect of GPU 140 is that video processing operations may be offloaded to GPU 140 to reduce CPU utilization. However, another aspect of GPU 140 is that it may generate video frames having improved display attributes. Video content may, for example, be created in an original format that is not optimized for displaying on a personal computer or a high definition television. For example, the original video content may be from conventional analog television having an interlaced frame format. GPU 140 may be utilized to perform a variety of operations on video content to improve the display of the source video content. As an illustrative example, the Nvidia PureVideo Decoder, sold by the Nvidia corporation of Santa Clara, Calif., works with GeForce 6 and 7 series GPUs. The GeForce 6 and 7 series GPUs include a programmable video processor, an MPEG-2 decoding engine, and a motion estimation engine. The Nvidia PureVideo Decoder utilizes hardware acceleration to perform de-interlacing, filtering, scaling, inverse telecine, format conversion, and other operations to accelerate video playback. Additionally, a variety of operations may be utilized to improve the display of video content on desktop personal computers, notebook personal computers (PCs), and high-definition televisions (HDTVs) with a reduction in visual artifacts, including sub-pixel calculations to reduce aliasing effects. It will thus be understood throughout the following discussion that in one embodiment GPU 140 supports one or more features to improve video playback and reduce CPU utilization, such as programmable video processing, MPEG-2 decoding, de-interlacing, inverse telecine, filtering, scaling, format conversion, and motion estimation.

In one embodiment, a software application 120 receives the digital content. Software application 120 may, for example, be a video application or media application. In one embodiment, at least a portion of the decoding of digital content is performed in software on a CPU or a processor engine, such as a media processor, as illustrated by coding/decoding (codec) block 125. For example, codec block 125 may perform MPEG-2 video coding/encoding operations.

A watermarking module 135 implements a digital watermarking algorithm to insert watermarks into versions of digital content generated by computing system 100 from received digital content. For video applications, watermarking module 135 generates commands to insert a watermark into frames of video 145. Watermarking module 135 is preferably implemented in software, although it will be understood that watermarking module 135 may also be implemented in hardware, firmware, and using a combination of hardware and software. Note that a watermark may be inserted into frames at playback of uncompressed video content or alternatively inserted into compressed video content, depending on the implementation. Additionally, as described below in more detail, in one embodiment watermarking module 135 also reads watermarks and may perform, for example, operations to determine whether playback is authorized.

As used in this application, a watermark for video content is a set of watermarking pixels embedded in one or more frames of video which is imperceptible to an ordinary observer viewing displayed video but which provides tracing information that may be utilized to trace the distribution of video content. Individual watermarking pixels replace a selected number of conventional pixels in a frame. Any pixel attribute, such as pixel color, may be utilized to encode tracing information. A conventional frame format includes a large number of pixels such that replacing a small number of the pixels with watermarking pixels will not change the end-user viewing experience, particularly if the watermarking pixels are dispersed across a frame. For example, the National Television Standards Committee standard (NTSC) format has frames with 720×480 pixels, or approximately 350,000 pixels. The Advanced Television Systems Committee (ATSC) high definition television standard typically has approximately 2 million pixels per frame. Each pixel in a frame has a number of different possible colors and brightness. As a result, even a small number of pixels can be used to embed a significant amount of tracing information. Thus a single watermark may require an extremely small percentage of the total number of pixels in a frame to encode tracing information. Additionally, an individual watermark or a set of watermarks may be dispersed across different frames. Typical frame rates used in video correspond to more than one thousand frames per minute (e.g., 1800 frames per minute, assuming 30 frames per second). Thus, even a small video file is capable of storing many sets of watermarks.

Exemplary watermarking information includes information identifying the system 100 which processed the content, such as a unique identifier, an Internet Protocol (IP) address of the host computer; a time stamp; and information regarding instances in which an end-user purchased a license to use content from a content server. The unique identifier may generally be any unique code useful for providing information to trace the distribution of content. Since video frames may be stored on computing system 100 for later playback. In one embodiment a watermark is generated only at the first instance that a video frame is generated in GPU 140. In one embodiment watermarking information is additive in that each new computer system having watermarking module 135 adds additional watermarks without destroying previous watermarks. Consequently, video content that is copied and distributed through multiple computing systems having watermarking module 135 will build up a cumulative set of watermarks that can be used to generate information for tracing the distribution of video content.

The watermarking pixels preferably are positioned and have attributes that resemble normal noise (e.g., the number and position of watermarking pixels is selected to have pseudo-noise characteristics) such that it is difficult for an end-user to identify the presence of watermarking pixels without knowledge of the algorithm used to embed the watermarking pixels. In particular, the number of pixels and arrangement of pixels used in a watermark can be made to resemble background noise in individual frames and across sequences of frames. Additionally in one embodiment watermarking pixels are encoded utilizing an encryption key to make it difficult for an end-user to decode the watermarking pixels without a corresponding decryption key. Thus, an end-user is unlikely to be able to decode the tracing information because they would have to know the algorithm used to select locations for watermarking pixels and also the manner in which tracing data is encoded in an arrangement of pixels.

The watermarking pixels may be embedded in a variety of different ways. In one embodiment, the embedding occurs during a video post-processing operation in GPU 140. Exemplary video post-processing operations include but are not limited to de-interlacing, scaling, noise-reduction, and flicker-filter operations.

Note that there are two domains in which a video file may exist. An uncompressed domain typically occurs at playback. For example, a compressed form of the video content is decompressed and the content is rendered for display. Watermarking of the decompressed content is useful to trace copies taken by directly accessing the output of a GPU 140. However, video files are typically stored and distributed in compressed form. The watermarking pixels may be embedded in a compressed domain or a decompressed domain. The decompressed domain includes versions generated for playback. Since content can be hacked into during playback (e.g., by tapping into the output of GPU 140), in some embodiments watermarking pixels are embedded during playback to trace copies copied during playback. Copies of content are typically stored in the compressed domain and are also typically distributed over the Internet in the compressed domain. Embedding watermarking pixels in compressed content requires utilizing an embedding technique compatible with the compression format which will not corrupt the video file and generate errors on playback. A variety of techniques may be used to embed watermarking pixels directly into video content, interleave watermarking pixels into video content, or place watermarking pixels into various wrappers and layers associated with video data, such as metadata. The Audio Video Interleave (AVI), developed by the Microsoft Corporation of Redmond, Wash., may, for example, be used to interleave watermarking pixels. AVI has a file format that permits multiple streams of data to be interleaved. In the compressed domain a file wrapper (e.g., a metadata wrapper, such as a MPEG-2 wrapper) may be written. The encoding of compressed video may also be performed utilizing transcoding or transrating algorithms. Some video data formats, such as MPEG-2, permit sub-picture data to be added. Additionally transcription may be used to embed watermarking pixels. Note that the information in the watermarking pixels is preferably immune to digital-to-analog (d/a) and analog-to-digital (a/d) transformations. That is, the watermarking pixels are preferably implemented in a manner resistant to being filtered out by operations that can be performed comparatively easily on all of the pixels by end users, such as a first (d/a) transformation from the digital domain to the analog domain and a second (a/d) transformation from the analog domain back to the digital domain.

As previously described, an individual watermark is preferably selected to be imperceptible to a human observer. In a sequence of video frames the human eye is unable to detect small deviations in pixels from an original image, particularly if the deviations occur in a small number of frames or vary from frame-to-frame. As is well known, the human eye has a resolution limit. Additionally, the human brain tends to filter out small image imperfections, particularly if the imperfections last for only a small number of frames. As a consequence, tracing information can be embedded as a pattern of pixels within a frame or across a sequence of frames in a manner imperceptible to a human viewer but detectable by computer software executing a decoding algorithm.

The watermarks preferably take into account errors generated during multiple instances of copying and transmission of video content. For example, the watermarks may include checksums or other error correcting techniques to correct for errors. Additionally, watermarks may be repeated more than once in a video file.

Computing system 100 embeds watermarks in a manner such that watermarks are retained in copies of the video content 105 distributed from computing system 100. For example a video file 150 stored in memory 155 may retain embedded watermarks such that if the video file 150 is distributed the watermarks are included along with the copy of the video content. However, it will be understood that the copies of the video content may have additional process steps performed by computing system 100 to store and distribute the copy as compressed and/or encrypted files. For example, received video content may be decoded, watermarks added, and optional video processing operations performed to generate a video file 150 for playback. The video file 150 may be stored as a compressed video file in which each frame retains the watermarks. The video file 150 with embedded watermarks may be stored to any suitable memory, such as a hard drive, storage memory, compact disc, or memory disc. The video file 150, in turn, may be distributed from computing system 100 using, for example, the Internet. For example, the video file 150 may be encoded as MPEG-2 files and sent as a transport stream over the Internet to another computer or server (not shown).

In one embodiment, watermarking module 135 is included in a graphics driver 130. Watermarking module 135 and graphics driver 130 work cooperatively with application 120 and codec 125 to generate commands to instruct GPU 140 to generate content in the form of video frames 145 having watermarks embedded in pixels. The watermarks may include a variety of different types of information to trace the distribution of content. In one embodiment, graphics driver 130 also reads watermarks and acts in response to detecting specific watermarks. For example, graphics driver 130 may be programmed to prevent unrestricted ordinary playback upon detecting specific watermarks. For example, if watermarks are detected indicating that the video content is not authorized, graphics driver 130 may prevent playback, restrict playback options (e.g., limited-time playback until the end-user purchases the video content), or perform other operations to assist in digital rights management.

Figure 2:
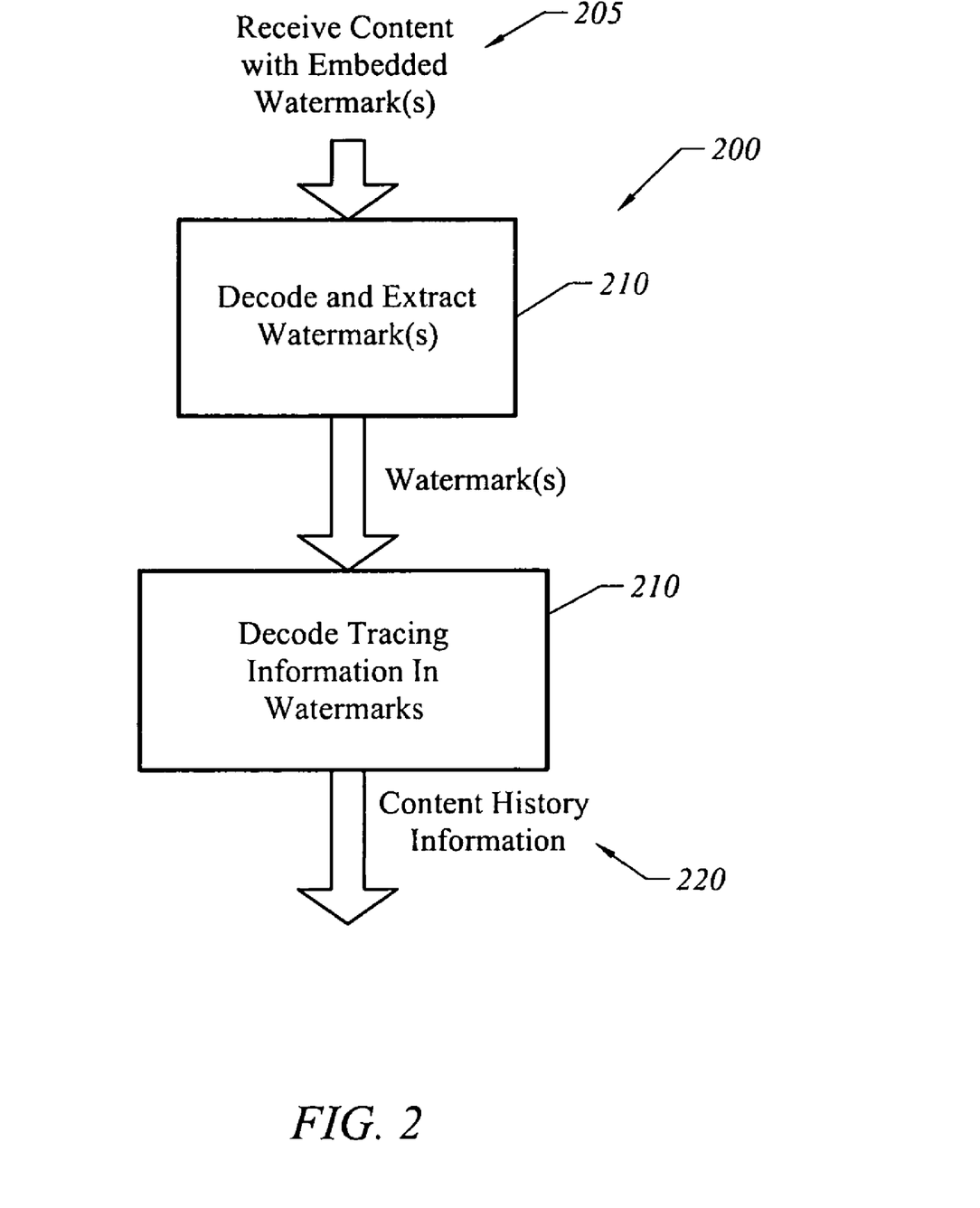
FIG. 2 is a block diagram illustrating a digital rights management system for tracing content distribution in accordance with one embodiment of the present invention.

FIG. 2 illustrates a digital rights management (DRM) system 200 for detecting tracing information. A copy of the content with embedded watermark(s) is received 205 for testing. The copy may, for example, have been posted on the Internet, distributed via the Internet, or accessed during an interaction of DRM system 200 with a subscriber. The video content is decoded and the watermarks are extracted 210. The watermark(s) are then decoded 215 to identify information regarding the distribution of the video content. For example, the IP addresses of computers that received the content may be decoded, along with time stamps indicating when the content was first accessed by a new user. Other types of information may also be decoded, such as instances in which the computer receiving the content was authorized by the DRM system 200 to copy the content. DRM system 200 may, for example, utilize a server-based system to perform the decoding operations and the generation of content history information 220.

DRM system 200 utilizes content history information 220 generated from watermarks to trace the distribution of video content. Tracing the distribution of content can be used as an adjunct to conventional security measures. For example, in addition to conventional security techniques, the present invention can also be used to trace the distribution of content to detect breaches in security and to assess the impact of breaches in security. For example, DRM system 200 may utilize information on the number of watermarks, identifying information (e.g., IP addresses) and time stamps to generate information on the nature and effect of security breaches. For example, content distributed from friend-to-friend is likely to eventually accumulate a large number of watermarks if the content passes through many different computers before being scanned by DRM system 200. However, content posted by a third party on a distribution server (not shown) may have a smaller number of watermarks if, for example, it is posted to the distribution server after passing through only a small number of computers. Correlation of information from different versions of the same content received from different sources may also provide useful information on distribution patterns. Additionally, as described below in more detail in one embodiment the tracing information is utilized to assess the impact of unauthorized copying on business revenues.

Figure 3:
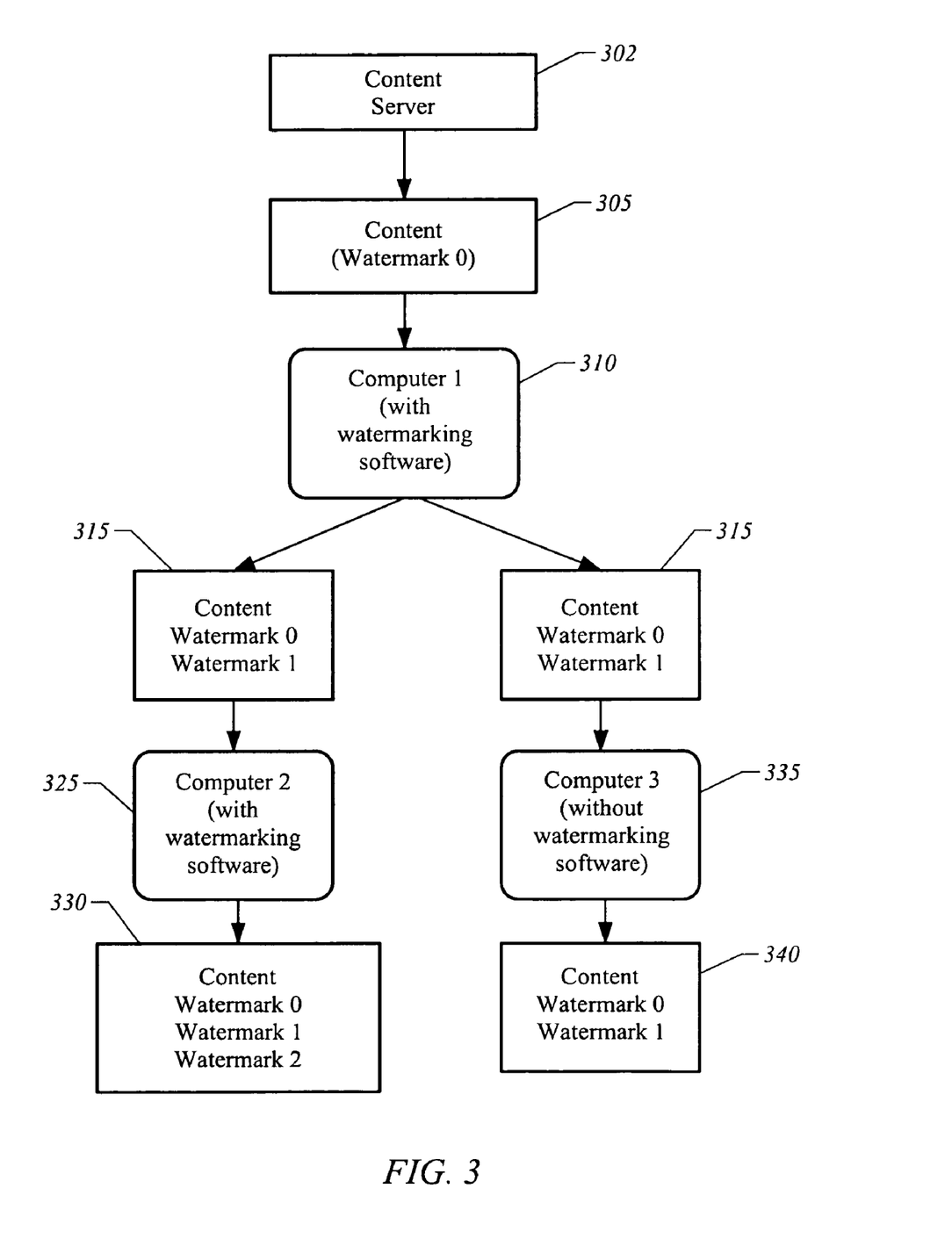
FIG. 3 illustrates a content distribution tree of video content with video watermarks in accordance with one embodiment of the present invention.

FIG. 3 illustrates an exemplary content distribution tree illustrating how watermarks change through a sequence of copying and distribution events in an embodiment in which watermarks are added cumulatively to previous watermarks. At some initial time, content 305 is distributed from a content server 302. The most general case is that content 305 is distributed with a default watermark, watermark 0. As one example, the default watermark could correspond to no watermark. Alternatively, the default watermark could be a watermark having an initial set of tracing information. As one example, a default watermark 0 may include information regarding a first authorized sale or downloading of video content.

Content server 302 may also be coupled to DRM system 200 to analyze the distribution of content. A first computer 310 with watermarking software receives content 305 and adds a first watermark, watermark 1. As a result, any copies 315 of the video content that are decoded and then distributed by first computer 305 will include both watermark 0 and watermark 1. A second computer 325 with watermarking software then receives the content and inserts watermark 2. As result, if the content is decoded and then distributed by second computer 325 the content 330 will include watermark 0, watermark 1, and watermark 2.

It is possible that some computers in a distribution path will not include a watermarking module 135, unless, for example, watermarking of video frames becomes a standard industry practice. For example, a third computer 335 without watermarking module 135 may receive content 315. Since third computer 335 does not add a new watermark, any content that is distributed from third computer 335 will still include its original watermarks, such as watermark 0 and watermark 1. However, even incomplete knowledge about content distribution may provide useful information on content distribution.

One aspect of content distribution is that there can be complex distribution patterns of content in which unauthorized distribution results in the loss of some sales but the losses are offset, in part, by new sales. For example, many individuals routinely send copies of digital content to each other via the Internet. However, an individual who receives an unauthorized copy of a single music video, movie, or television episode may sample the content and then decide to buy the sampled content, a more complete version of the sampled content, or related content from the original content provider. Knowledge of content distribution pathways is thus useful to generate an accurate understanding of the impact of unauthorized copying and distribution on a content provider. Such knowledge is useful, for example, to determine how much effort should be dedicated to securing content.

Figure 4:
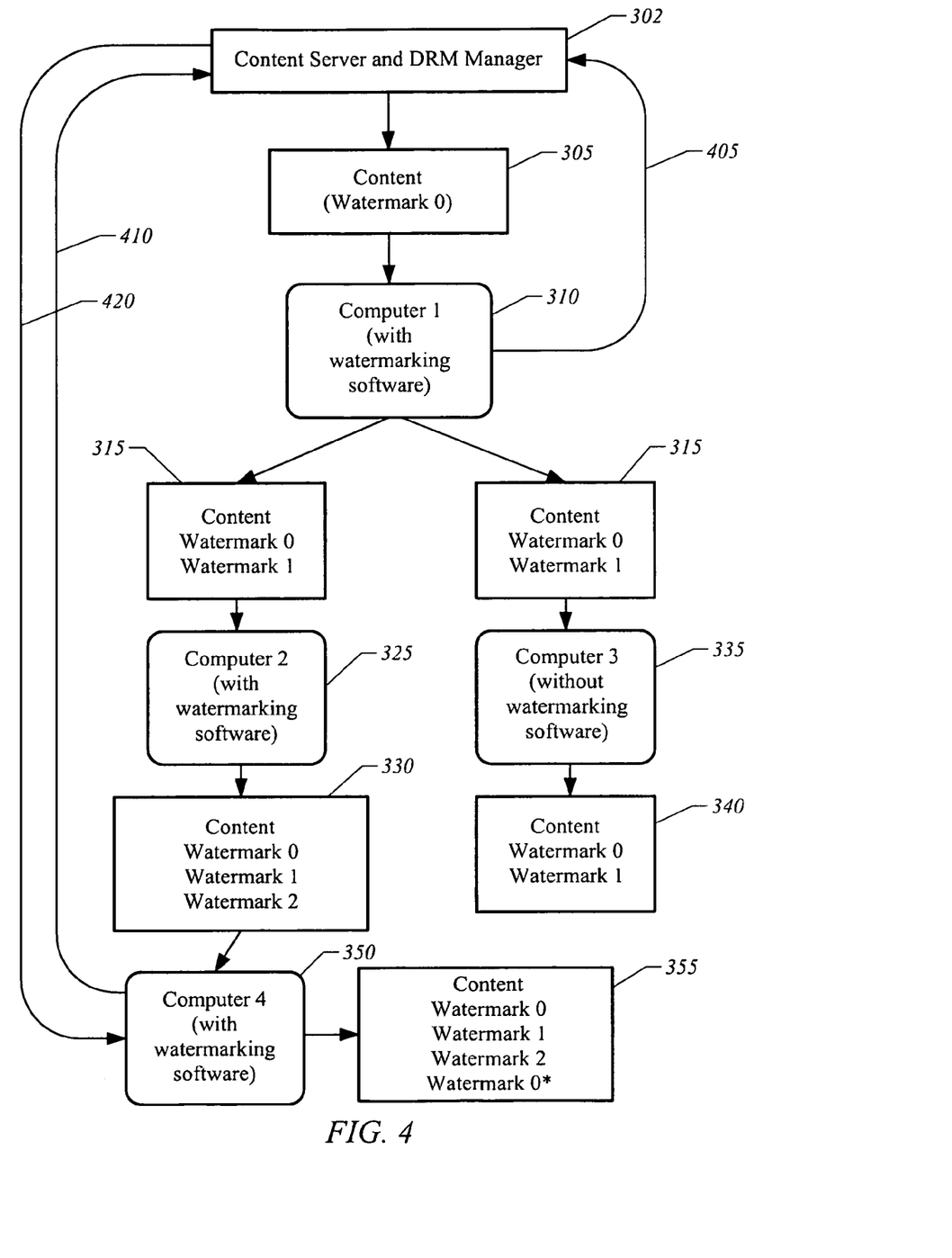
FIG. 4 illustrates a content distribution tree of video content with watermarks and interactions with a content server in accordance with one embodiment of the present invention.

Referring to FIG. 4, in one embodiment the watermarking module 135 is further adapted to receive commands from content server 302 to add a watermark indicating that a user has accessed the content server and has received authorization for the sampled content, a more complete version of the sampled content related content, or other content provided by the content provider. Content server 302 may also collect information on watermarks when a user accesses the content server 302. Content server 302 is preferably coupled to or includes the functionality of DRM system 200. In one embodiment content server 302 includes the capability to read watermarks in video files stored on a computer. For example content server 302 may scan stored video files. Alternatively watermarking module 135 may be adapted to provide summary information on watermarks to content server 302.

As indicated by arrow 405, an individual computer, such as computer 310, may interact with content server 302. For example, an individual user may decide to place an order with content server 302. Content server 302 may record these interactions for later use in associating interactions with content history information 220. Additionally in one embodiment content server 302 may also generate commands issued to a computer hooked up to content server 302 for watermarking module 135 to add an additional set of watermarks indicative of the interaction. For example, the additional set of watermarks may be used to indicate the most recent date which an individual computer 310 was provided authorization to download or use content. Thus the content history information 220 will include a sequence of watermarks indicating the distribution of content along with information (either stored in content server 302 or passed along in watermarks) indicating subsequent interactions of different end-users with content server 302.

Note also that a unique identifier in a watermark generated by a particular computer system may also be used as a reference to associate interactions with content server 302 with particular watermarks. Thus, in some implementations it may not be necessary to update watermarks to record interactions with content server 302 because the unique identifier provides sufficient information to reconstruct interactions from records of interactions stored in content server 302.

Additionally, other computers in the distribution tree, such as computer 350, may also have interactions with content server 302. As in the previous example, content server 302 may record these interactions. Additionally, content server 302 may generate commands for computer 350 to add an additional watermark indicative of the interaction with the content server.

In one example, computer 350 receives content 330. An end-user utilizing computer 350 samples content 330 and then accesses content server 302, as indicated by arrow 410. As an illustrative example, an end-user of computer 350 may decide to purchase the sampled content, purchase content related to the sampled content, purchase a more complete version of the sampled content, or purchase content unrelated to the sampled content. Content server 420 may record the interaction and then generate a command for computer 350 to add an additional set of watermarks to content 330 to generate content 355 having a watermark 0*. Watermark 0* may, for example, indicate that computer 350 received an authorization to use content. Watermark 0* could also have specific information, such as whether the user of computer 350 purchased the sampled content, related content, a more complete version of the content, or unrelated content.

It can be understood from FIG. 4 that watermarks may grow over time to include complex information. on the relationship between authorized use, unauthorized sampling, and the generation of additional sales from unauthorized sampling. This information may be useful to generate information to determine the cost/benefit ratio of conventional security measures. Additionally, data may be collected to create statistics indicative of baseline "normal" levels of sampling and unauthorized distribution. The baseline data may also include information on typical time patterns with which content is distributed; typical IP address distributions; typical unique identifier distributions; or typical ratios of unauthorized samples to subsequent purchases generated by sampled content. The baseline data may be useful, for example, to identify changes in unauthorized distribution indicative of a problem that needs to be addressed. Another application is to generate information on the effect of unauthorized distribution and sampling of video content on sales.

Figure 5:
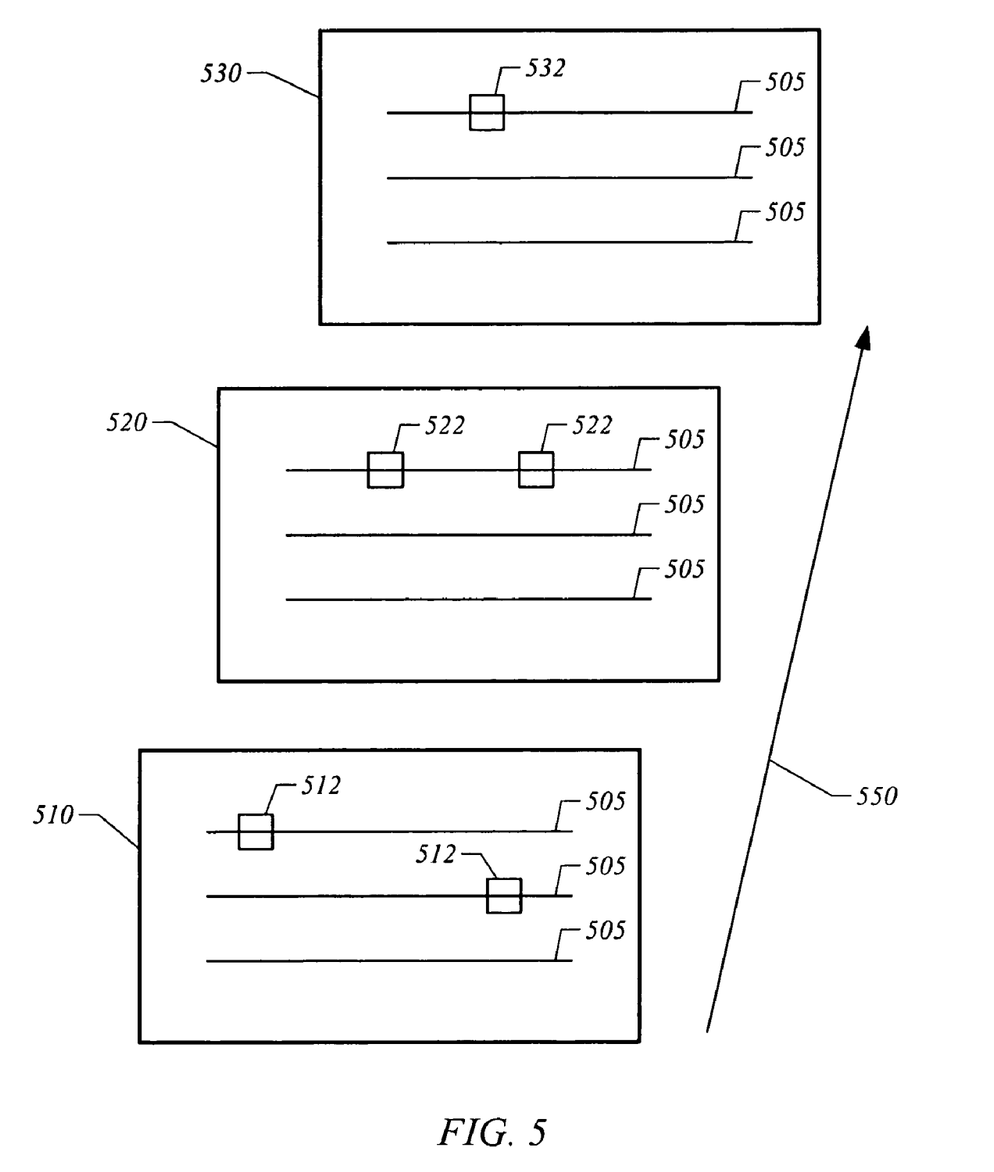
FIG. 5 illustrates exemplary watermarked video frames.

FIG. 5 illustrates a set of frames 510, 520, and 520 and exemplary individual pixels 512, 522, and 532 used as watermarks in individual frames. Individual pixels are preferably referenced to locations along individual horizontal scan lines 505. As indicated by arrow 550, watermarks may be distributed across frames. In one embodiment, an individual watermark is located on one frame. However, more generally an individual watermark may also be distributed across a sequence of frames 510, 520, and 530. Similarly, a set of watermarks may be located on an individual frame or distributed across a set of frames 510, 520, and 530. There are some advantages, however, to placing each watermark on a different set of frames from other watermarks. Watermarks may also be repeated through a sequence of frames of a video file to improve noise immunity during copying and transmission.

It will thus be understood from the previous discuss that new sets of watermarks may be read by a graphics driver to provide revokability and renewability functionality. A revokable functionality permits an authorization to use content to be revoked. For example, a graphics driver may be programmed to prevent playback of video content if the watermarks indicated that the content is unauthorized. A renewability functionality may be implemented by having the graphics driver read the watermarks and permit playback if the new sets of watermarks indicates a purchase of content.

The watermarks may be embedded utilizing a video processing operation such as scaling, noise reduction, flicker-filtering, and de-interlacing. In one embodiment, a de-interlacing algorithm is used to insert watermarking pixels into frames of content generated from video fields. As is well known, conventional television has interlaced fields (e.g., odd/even fields each of which has half of the information of a television frame) which must be de-interlaced to generate progressive frames for use on computer displays. In conventional de-interlacing algorithms line doubling techniques are commonly used to convert odd and even frames into full progressive frames. In particular, the lines of an individual field are line-doubled to generate the information for a single frame. Scaling may also be performed to account for differences in frame size. Referencing individual pixels of a watermark along horizontal scan lines 505 has several advantages. First, referencing watermarking pixels along horizontal scan lines 505 retains watermarking information even if a line doubling de-interlacing algorithm is used to convert fields into a frame. Second, scaling effects can be compensated for by referencing pixels along horizontal lines by their relative positions along scan lines. The relative positions (e.g., one-quarter of the length down a horizontal scan line) does not change with scaling of the number of pixels along the horizontal dimension. Note that in one embodiment there is preferably at least one line of watermarking data that is identical to the original line as a seed line. In some cases filtering may be applied by replication. Note that the de-interlacing and filtering algorithms performed by GPU 140 are adapted to recover the original content from content having embedded watermarks. That is, GPU 140 includes processing algorithms adapted, if necessary, to account for embedded watermarking pixels.

While the present invention has been described in regards to an example having a GPU 140, more generally it will be understood that the present invention may also be applied to systems that do not utilize a GPU. For example, in an alternate embodiment watermarking module 135 is adapted to perform all of the operations necessary to insert watermarking pixels. The watermarking module 135 could, for example, be part of a video application 120. However, a drawback of such an implementation is that it increases CPU utilization.

The present invention may be applied to digital video content in a wide variety of different formats. Exemplary formats include MPEG-1, MPEG-2, MPEG-4, Windows Media Video 9, H.264, DivX, Xvid, wavelet, sub-band coding, Real Video, and Quick Time.

It will be understood that the present invention may also be applied to digital audio content as well. Digital audio content may, for example, be processed on a GPU 140 and watermarks embedded by GPU 140. Digital audio content may be distributed in file formats such as MPEG, Windows Media, etc. such that similar techniques to those previously described may be utilized to insert watermarks into audio files, such as embedding watermarks in file wrappers, or adding watermarks during transcoding, transrating, or transcription.

As previously discussed, watermarking module 135 may be implemented in software that may be stored on a computer readable medium. It will thus be understood that an embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus for tracing distribution of video content through a content distribution pathway having a plurality of computing systems through which the content is distributed from an originating content server, comprising:

a watermarking module disposed within an individual computing system along the content distribution path operative to display the video content, the watermarking module operative to insert a set of watermarking pixels into a watermark in video frames generated from video content received by said individual computing system, said set of watermarking pixels encoding tracing information that is imperceptible to an end-user viewing displayed video frames and which is included in a version of said video content;

the watermark in the video frame including the set of watermarking pixels added by the watermarking module disposed within the individual computing system with the watermark further including any sets of watermarking pixels added by previous computing systems along the distribution pathway such that distribution of content from the content server is traceable through the distribution path.

2. The apparatus of claim 1, wherein said watermarking module is a software module operative to work cooperatively with a graphics driver to generate commands for a graphics processing unit (GPU) to insert said set of watermarking pixels into frames rendered by said GPU and stored as a video file, said GPU embedding watermarking pixels via at least one of encoding in a file wrapper, transcoding, transrating, sub-picture modification, and transcription.

3. The apparatus of claim 2, wherein said GPU inserts said set of watermarking pixels into frames of video content during a video processing operation.

4. The apparatus of claim 1, wherein said set of watermarking pixels are inserted into at least one of an uncompressed version of video content generated at playback and a compressed version of video content generated for storage or distribution and immune to digital-to-analog and analog-to-digital transformations.

5. The apparatus of claim 1, wherein said video content is in a format selected from the group consisting of MPEG-1, MPEG-2, MPEG-4, Windows Media Video 9, H.264, DivX, Xvid, wavelet, sub-band coding, Real Video, and Quick Time.

6. The apparatus of claim 1, wherein said watermarking module encodes tracing information unique to said computing system.

7. The apparatus of claim 1, wherein said watermarking module encodes tracing information including at least one member selected from the group consisting of a time stamp, an Internet Protocol address, and a unique identifier.

8. The apparatus of claim 1, wherein said watermarking module generates watermarking pixels including tracing information that is additive to that of any watermarking pixels previously present in said video content.

9. The apparatus of claim 1, wherein said watermarking module is operative to receive commands from a content server and in response thereto insert a set of watermarking pixels into previously received video content indicative of an interaction with said content server.

10. A system for tracing the distribution of video content through a distribution pathway of computing systems, comprising:
a plurality of computing systems operative to display video content, each computing system having a watermarking module to add watermarking pixels to a watermark of received video content, the watermark accumulating watermarking information along the distribution pathway from each watermarking module that encounters the watermark;
a digital rights manager, said digital rights manager detecting watermarking information in video files corresponding to an initial default set of watermarking pixels inserted in video content distributed to subscriber computing systems and any additional sets of watermarking pixels inserted by individual computer systems having a watermarking module for adding watermarking pixels to received copies of said video content.

11. The system of claim 10, wherein each watermarking module is a software module operative to work cooperatively with a graphics driver to generate commands for a graphics processing unit (GPU) to insert said watermarking pixels into a version of said video content.

12. The apparatus of claim 11, wherein each said GPU performs de-interlacing of video fields to generate frames from input video content and said watermarking pixels are inserted into frames by said GPU in a de-interlacing process.

13. The system of claim 10, further comprising a content server distributing said video content to said subscriber computing systems, wherein said content server, in response to detecting that a new subscriber computing system has received unauthorized content, updates information indicative of the interaction between the new subscriber computing system and the content server.

14. The system of claim 13, wherein said content server generates a command to said new subscriber computing system to update watermarking information to add a new set of watermarks indicative of the interaction.

15. The system of claim 14, wherein said new set of watermarks are indicative of a purchase of content related to said unauthorized content.

16. The system of claim 14, wherein said new set of watermarks are indicative of a purchase of content unrelated to said unauthorized content.

17. The system of claim 10, wherein individual computers having said watermarking module insert watermarking pixels encoding tracing information including at least one member selected from the group consisting of a timestamp, a unique identifier, and an Internet Protocol address.

18. A method of tracing the distribution of video content, comprising:
providing watermarking modules in a plurality of computing systems each operative to display video content;
receiving video content at an individual computing system; and
at said individual computing system, generating at least one command for a graphics processing unit (GPU) to insert a set of watermarking pixels into rendered frames such that copies of said video content distributed from said computing system include watermarking pixels;
a watermark in the video frame including the set of watermarking pixels added by the watermarking module disposed within the individual computing system with the watermark further including any sets of watermarking pixels added by previous computing systems along a distribution path such that distribution of content is traceable through the distribution path.

19. The method of claim 18, wherein said generating commands comprises utilizing a graphics driver to generate commands for inserting watermarking pixels.

20. The method of claim 18, said GPU inserts said set of watermarking pixels into frames during video processing.

21. The method of claim 18, further comprising receiving a command from a content server and in response generating at least one command for said GPU to add an additional set of watermarks indicative of an interaction with said content server.

* * * * *